United States Patent

Fujii et al.

[11] Patent Number: 5,133,822
[45] Date of Patent: Jul. 28, 1992

[54] PROCESS FOR RAPID BONDING OF LUMBERS BY SURFACE HEATING

[75] Inventors: Tsuyoshi Fujii; Atsushi Miyatake, both of Ibaragi, Japan

[73] Assignee: Forestry and Forest Products Research Institute, Ibaragi, Japan

[21] Appl. No.: 527,118

[22] Filed: May 22, 1990

[30] Foreign Application Priority Data

May 26, 1989 [JP] Japan .................. 1-134286

[51] Int. Cl.⁵ .......................................... B32B 31/00
[52] U.S. Cl. .......................... 156/274.8; 156/285; 156/321; 156/322
[58] Field of Search .............. 156/272.2, 274.4, 274.6, 156/274.8, 275.7, 285, 322, 380.9, 321

[56] References Cited

U.S. PATENT DOCUMENTS 2,729,584  1/1956  Foster ................ 156/322 X
3,242,025  3/1966  Copp ................. 156/322 X
4,756,091  7/1988  Van Denend .......... 219/354 X

OTHER PUBLICATIONS

*Encyclopedia of Polymer Science and Technology*, "Dielectric Heating", vol. 5, 1966, pp. 1-23.
Tsuyoshi Fujii, "Wood Industry", vol. 37, No. 419, pp. 5 (59) to 6 (60), (1982).

Primary Examiner—David A. Simmons
Assistant Examiner—Chester T. Barry
Attorney, Agent, or Firm—Kramer, Brufsky & Cifelli

[57] ABSTRACT

A process for the rapid bonding of lumber by surface heating is provided, which involves surface heating of a first piece of lumber to be bonded and applying an adhesive to the non-heated surface of another piece of lumber and then contacting the thus-prepared pieces of lumber and applying pressure with a cold press.

4 Claims, 7 Drawing Sheets

FIG. 4
 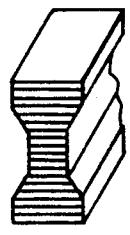
FIG. 5(a)     FIG. 5(b)
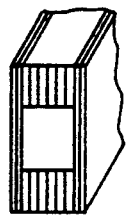 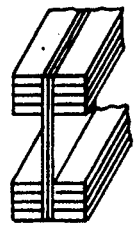
FIG. 6
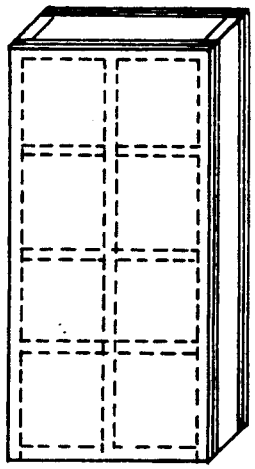

PROCESS FOR RAPID BONDING OF LUMBERS BY SURFACE HEATING

BACKGROUND OF THE INVENTION

1. Industrial Field

This invention relates to a method for the high speed bonding of lumber by surface heating. More specifically, this invention is very effective for rapid bonding of laminated wood or wood architectural members such as panels, I-beams, trusses or the like.

2. Description of the Prior Art

Wood has a good appearance, workability, availability and is a renewable resource. In light of these merits, new uses for wood are now being considered.

When manufacturing laminated wood structures or wood architectural members such as panels, I-beams, trusses or the like, suitable chemical adhesion is an effective bonding means.

Conventionally, when bonding laminated wood with decorative veneers, several alternative bonding processes have been employed, as shown in FIG. 10.

[1] Cold Press System

In accordance with this system, both surfaces of a dried lamina are planed with a planer and a lamina having 15 mm to 40 mm in thickness is prepared. One surface or both surfaces of the lamina are then coated with a glue. In this manner, a plurality of laminae in a vertical relation, as shown in FIG. 10, are assembled. The assembled laminae are then clamped by a screw clamping means and pressed by a cold press means (oil pressure). For a time period of from several hours to 24 hours, the assembled laminae are heated and clamped. Then, pressure is released.

Curing in this system requires a full day in many cases, so that productivity is too low. To solve this disadvantage, the following two systems have been adopted.

[2] High Frequency Through Heating System

In accordance with this system, a plurality of laminae assembled one above another with an adhesive are clamped and pressed using a cold press. When the required pressure is obtained, high frequency energy is applied to the assembled laminae by way of two parallel electrode plates disposed on upper and lower surfaces of the assembled laminae. When the adhesive layers reach a curing temperature, the high frequency energy application is ceased and pressure is released.

[3] Hot Press System

In a third system, both surfaces of each wood strip are planed with a planer and finished smoothly. Then, both surfaces of or both sides of each strip are spread with glue. Subsequently, a dried veneer strip 0.5 to 2 mm in thickness is placed on the laminated wood, and all strips are pressed using a hot press. When the glue layer between the laminated wood and veneer strips has reached the required curing temperature, the pressure is released.

As mentioned above, in the hot press system the materials used are limited to thin materials. In the high frequency through heating system, high energy must be supplied, so that production cost is increased, and further, when employing the high frequency, a large power output must be supplied, so that production cost is increased.

BRIEF SUMMARY OF THE INVENTION

It is therefore a general object of this invention to provide a process for bonding strips of lumbers by surface heating, which comprises a step of heating a surface of a first lumber strip, a step of spreading a surface of a second lumber strip with an adhesive, and a step of contacting closely the heated surface of the first lumber strip and the glue-coated surface of the second lumber strip to assemble the strips and then clamping the thus-prepared strips.

It is another object of this invention to provide a process for bonding lumber by surface heating, which comprises a step of jetting steam to a surface of a first piece of lumber prior to heating to equalize the surface temperature thereof and improve high frequency absorption.

It is another object of this invention to provide a process for bonding pieces of lumber by surface heating, in which the curing time as well as the power output required is reduced.

Other features and advantages of this invention will be apparent from the following description taken in connection with the accompanying drawing.

BRIEF DESCRIPTION OF THE ACCOMPANYING DRAWING

FIG. 4 is a view of a laminated wood structure.

FIG. 5A is a view of a laminated box-beam.

FIG. 5B is a view of an I-beam.

FIG. 6 is a view of a wooden panel.

DETAILED DESCRIPTION OF PREFERRED EMBODIMENTS

Preferred embodiments of this invention will be described with reference to the accompanying drawing.

Figure 1:
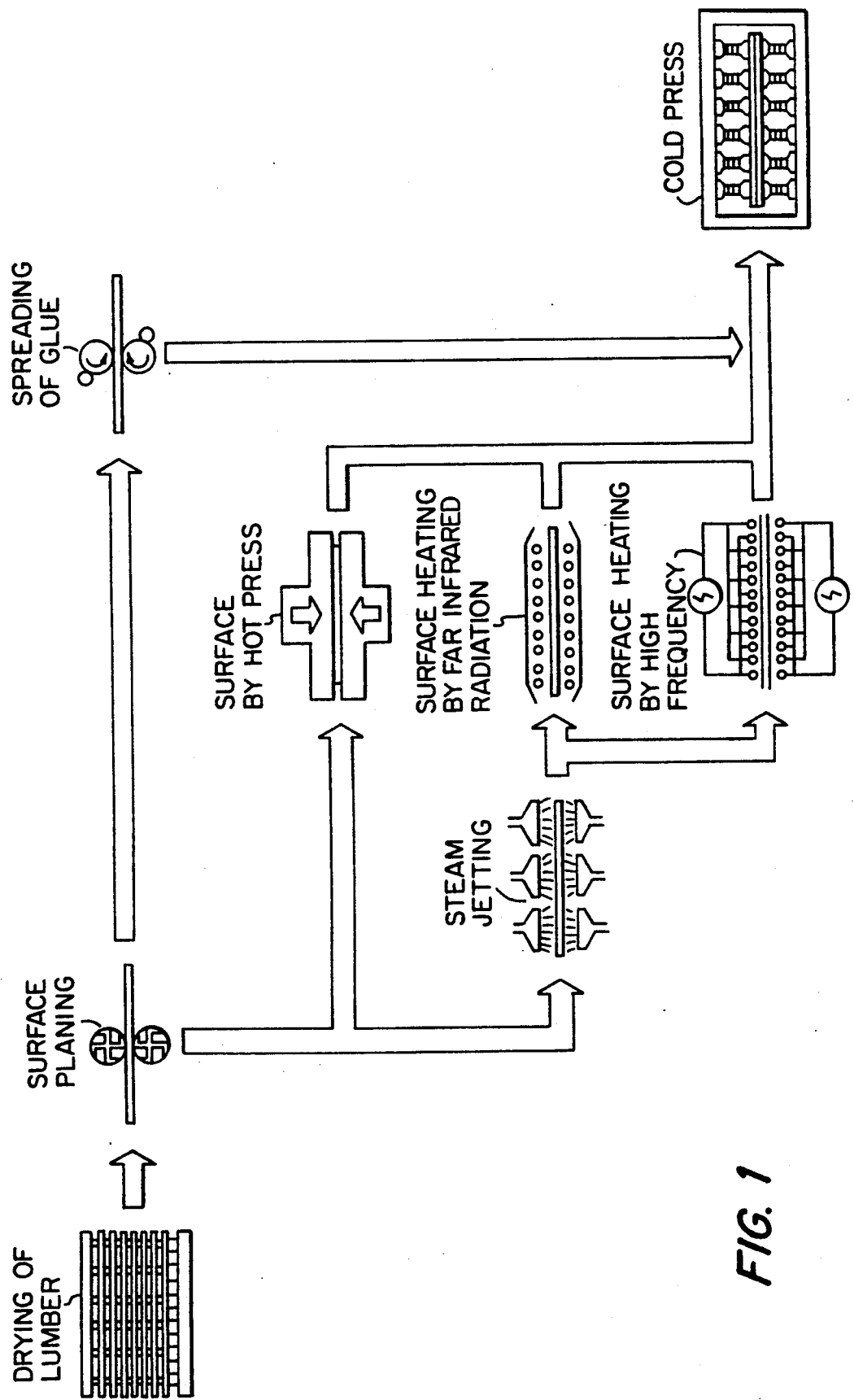
FIG. 1 is a flow chart of a process according to a first embodiment of this invention.

FIG. 1 shows a basic process of a first embodiment and a second embodiment according to this invention. The first embodiment will now be discussed with regard to the basic process.

(1) A first piece of dried lumber is planed by a planer or the like, and its surface is finished flatly and smoothly.

(2) Steam is jetted to the surface of this first of two pieces of lumber to be bonded together. In case where the steam pressure of a steam jetting device is 2 kg/1 cm$^2$, the diameter of the jetting holes is about 1 mm, the spacing is about 10 mm × about 10 mm and the steam jetting time is 10 to 15 seconds, the temperature of the lumber at a distance of from 5 to 10 mm from the jetting holes is raised to 50° to 60° C.

(3) Subsequently, high frequency energy is applied to the steam-jetted surface of the first piece of lumber. The required high frequency energy is calculated suitably in accordance with the properties of the lumber being used. In the case of a high frequency heating device in which a plurality of parallel electrode grids are positioned relative to each other with a space of 20 mm, the required time is 30 to 45 seconds, and the surface temperature of the lumber is raised to 120° to 150° C.

(4) A surface of the other one of the two pieces of lumber to be bonded together is coated with a glue at a thickness of 200 to 300 g/m².

(5) The steam-jetted and high frequency heated surface of the first piece of lumber is assembled to the adhesive-coated surface of the other piece of lumber.

(6) Within one minute from this assembling, the assembled pieces of lumber are clamped together and pressed for 1 to 2 minutes under the pressure of 5 kg to 15 kg/cm² by use of a cold press means. When releasing the cold press means, the two pieces of lumber are firmly bonded to each other.

It is to be understood that the heating of the lumber can be carried out by a hot press means or a far infrared radiation, in addition to the foregoing high frequency heating.

A second embodiment of this invention will be discussed with reference to FIG. 1.

(1) A finished surface of a first piece of lumber is coated with a glue.

(2) A surface of the second piece of lumber is heated to the temperature of 150° C. with a hot press means.

(3) Subsequently, the glue-coated surface of the first piece of lumber is assembled with the heated surface of the second piece of lumber.

(4) The thus-assembled pieces of lumber are clamped and pressed as soon as possible.

The foregoing clamping and pressing means is a cold press means in this embodiment.

The heating time of test of the foregoing hot press means was varied in three cases, with heating conducted for 360 seconds, 480 seconds and 600 seconds. In each case, the clamping and pressing time was the same. (The clamping conditions were as follows: cold press system, a cold plate, temperature: 20° C., clamping and pressing time: 3 minutes).

As shown in Table 1 below the bonding performance was the best where the heating time exceeded 480 seconds. Needless to say, the foregoing hot press means may be replaced with a far infrared radiation means.

The following are the test results of (a) a high frequency application means, (b) a hot press means, (c) a far infrared radiation means (none of (a), (b) and (c) employed a steam jetting system) and (d) a steam jetting high frequency application system.

(a) High frequency application means for surface heating:
1) Material
   Species: Japanese larch
   Specific gravity: 0.45 to 0.60
   Moisture content: 10 to 15%
   Dimension: 20 mm thickness × 150 mm width × 300 mm length
2) Adhesion
   Resolcynol resin adhesive -continued Ratio of contents: 100 parts of adhesive,
   15 parts of paraformaldehyde,
   10 parts of filler
   Glue coating: 200 to 300 g/m²
3) Conditions of high frequency heating
   High frequency power: 1.25 kw
   (6.5 kv voltage,
   0.38 A current)
   Type of electrode: parallel electrode grid
   (150 mm grid length, 20 mm
   spacing between grids and 16
   pieces in the number of grids)
   Heating time: 60 to 120 seconds
4) Conditions of cold press
   Temperature of cold plate: 20° C.
   Clamping pressure: 7.5 to 10.0 kg/cm²
   Clamping time: 1.0 to 2.0 minutes (b) Hot press means for surface heating
1) Species: Japanese larch
   Specific gravity: 0.45 to 0.60
   Moisture content: 10 to 15%
   Dimension: 20 mm thickness × 150 mm width × 300 mm length
2) Adhesive
   Resolcynol resin adhesive
   Ratio of contents: 100 parts of adhesive
   150 parts of paraformaldehyde
   10 parts of filler
   Glue coating: 200 to 300 g/m²
3) Condition of Hot press means for surface heating:
   Temperature of hot plate: 150° C.
   Clamping pressure: 2 to 3 kg/cm²
   Clamping time: 6 to 10 minutes
4) Conditions of cold press
   Temperature of cold plate: 20° C.
   Clamping pressure: 7.5 to 10.0 kg/cm²
   Clamping time: 3 minutes (c) Far infrared radiation for surface heating
1) Material
   Species: Japanese larch
   Specific gravity: 0.45 to 0.60
   Moisture content: 10 to 15%
   Dimension: 20 mm thickness × 150 mm width × 300 mm length
2) Adhesive
   Resolcynol resin adhesive
   Ratio of contents: 100 parts of adhesive,
   15 parts of paraformaldehyde
   10 parts of filler
   Glue spread: 200 to 300 g/m²
3) Condition of far infrared radiation
   Power of heater: 0.75 kw
   Distance of radiation: 40 mm
   Radiation time: 60 to 120 seconds
4) Conditions of cold press
   Temperatures of cold plate: 20° C.
   Clamping pressure: 7.5 to 10.0 kg/cm²
   Clamping time: 2 minutes (d) Steam jetting high pressure application for surface heating
1) Material
   Species: Japanese larch
   Specific gravity: 0.45 to 0.60
   Moisture content: 10 to 15%
   Dimension: 20 mm thickness × 150 mm width × 300 mm length
2) Adhesive
   Resolcynol resin adhesive
   Ratio of contents: 100 parts of adhesive,
   15 parts of paraformaldehyde
   10 parts of filler
   Glue coating: 200 to 300 g/m²
3) Conditions of steam jetting
   Steam pressure: 2 kg/cm²

-continued

|  |  |  |
|---|---|---|
| Jetting area: | 150 mm × 300 mm | |
| Jetting hole: | 1 mm diameter | |
|  | 10 mm × 10 mm spacing | |
| Jetting time: | 10 to 15 seconds | |

4) Conditions of high frequency heating

|  |  |
|---|---|
| High frequency power: | 2.5 kw (6.5 kv voltage, 0.77 A current) |
| Type of electrode: | parallel electrode grid (150 mm grid length, 20 mm grid spacing, 16 pieces in the number of grid) |
| Heating time: | 30 to 45 seconds |

5) Conditions of cold press

|  |  |
|---|---|
| Temperature of cold plate: | 20° C. |
| Clamping pressure: | 7.5 to 10.0 kg/cm² |
| Clamping time: | 1.5 to 2 minutes |

Table 1 sets forth the bonding performance obtained in each case under the foregoing bonding conditions as well as that obtained in a conventional case.

Table 1 (Bonding conditions and bonding performance in the first and second embodiments)

| Bonding system | Heating conditions 1 | | Heating conditions 2 | |
|---|---|---|---|---|
|  | Heating system | Time (sec.) | Heating system | Time (sec.) |
| Cold press | none | | none | |
| Through heating by hot press | none | | none | |
| Through heating by high frequency | none | | none | |
| Surface heating by hot press | none | | hot press 15° C. | 360 480 600 |
| Surface heating by high frequency | none | | high frequency 1.25 KW | 60 90 120 |
| Surface heating by far infrared radiation | none | | heater 0.75 KW | 60 90 120 |
| Steam jetting/ high frequency application | steam jetting | 10 12.5 15 | high frequency 2.5 KW | 30 37.5 45 |

| Bonding system | Clamping conditions | | Total time (min) | Heat amount (°C. min) | Power amount (KW min) |
|---|---|---|---|---|---|
|  | Clamping system | Time (min) | | | |
| Cold press | Cold press at 20° C. | 1 day | 1 day | | |
| Through heating by hot press | hot press at 100° C. | 18.0 21.0 24.0 | 18.0 21.0 24.0 | 1800 2100 2400 | |
| Through heating by high frequency | Cold press/ high frequency 1.25 KW | 6.0 7.5 9.0 | 6.0 7.5 9.0 | | 14.6 18.3 21.9 |
| Surface heating by hot press | Cold press 20° C. | 3.0 3.0 3.0 | 9.0 11.0 13.0 | 900 1200 1500 | |
| Surface heating by high frequency | Cold press 20° C. | 1.0 1.5 2.0 | 2.0 3.0 4.0 | | 2.5 3.8 5.0 |
| Surface heating by far infrared radiation | Cold press 20° C. | 2.0 2.0 2.0 | 3.0 3.5 4.0 | | 0.7 1.1 1.5 |
| Surface heating by steam jetting/ high frequency application | Cold press 20° C. | 1.50 1.75 2.00 | 2.2 2.4 3.0 | 20 25 30 | 2.5 3.2 3.8 |

| Bonding system | Test Results of Bonding Performance | | | | |
|---|---|---|---|---|---|
|  | Knife test | Delamination boiling hot water soak | Reduction of thickness | Bonding strength | Wood failure |
| Cold press | ⊙ | ⊙ | ⊙ | ⊙ | ⊙ |
| Through heating by hot press | ○ Δ x | ⊙ ⊙ ⊙ | ⊙ ⊙ ○ ⊙ | ⊙ ⊙ ⊙ | ⊙ ⊙ ⊙ |
| Through heating by high frequency | ○ ○ ○ | ○ ⊙ ○ ⊙ | ⊙ ⊙ ⊙ | ⊙ ⊙ ⊙ | ⊙ ⊙ ○ |
| Through heating by hot press | ○ Δ Δ | ○ Δ Δ | ⊙ ⊙ ⊙ | ⊙ ○ ⊙ | ⊙ Δ ○ |
| Surface heating by high frequency | ○ ○ ○ ⊙ ○ | ⊙ ○ ⊙ ⊙ ⊙ | ⊙ ⊙ ⊙ ⊙ ⊙ | ⊙ ⊙ ⊙ ⊙ ⊙ | ⊙ ⊙ ⊙ ⊙ ⊙ |
| Surface heating by far infrared radiation | Δ Δ Δ ○ ○ ○ | ⊙ ⊙ ⊙ ○ ○ ⊙ ○ | ⊙ ⊙ ⊙ ○ | ⊙ ⊙ ○ ○ | ⊙ ○ ○ ⊙ ⊙ |
| Surface heating by hot press | ⊙ ○ ○ | ⊙ ○ ○ | ⊙ ○ ○ | ⊙ ⊙ ⊙ | ⊙ ⊙ ⊙ |
| Surface heating by high frequency | x x x Δ ○ Δ ○ ○ ○ | x x x Δ ○ ○ ○ ○ ○ | ⊙ ⊙ ⊙ ⊙ ○ ⊙ ○ ○ ○ | Δ ○ ○ ○ ⊙ ⊙ ⊙ ⊙ | Δ Δ ○ ○ ⊙ ⊙ ⊙ ⊙ |
| Surface heating by far infrared radiation | x Δ ○ | x ⊙ ○ | ⊙ ⊙ ⊙ | x ⊙ ○ | x ○ ○ |
| Surface heating by steam jetting and high frequency | Δ Δ Δ Δ Δ Δ ○ ○ ○ | Δ ⊙ ○ ⊙ ○ ⊙ ○ ⊙ ○ ○ | ⊙ ⊙ ⊙ ⊙ ⊙ ⊙ ⊙ ⊙ ⊙ | ⊙ ⊙ ⊙ ⊙ ⊙ ⊙ ⊙ ⊙ | ⊙ ⊙ ⊙ ⊙ ○ ○ ⊙ ⊙ ○ |

| Symbol | percentage of wood (%) | percentage of delamination (%) | percentage of reduction (%) | percentage bonding strength (kg/cm²) | percentage of wood failure (%) |
|---|---|---|---|---|---|
| ⊚ | 60~ | ~1 | ~1 | 90~ | 70~ |
| △ | 30~60 | 1~5 | 1~2 | 70~90 | 50~70 |
| ○ | 10~30 | 5~10 | 2~5 | 50~70 | 30~50 |
| × | 0~10 | 10~ | 5~ | 0~50 | 0~30 |

Remarks:

In the knife test, the degree of bonding immediately after the clamping pressure was released was examined. In the block shearing test, the bonding strength was examined. In the boiling water soak delamination test, durability of adhesion was examined. Further, the degree of dimensional reduction was examined.

When using the bonded pieces of lumber in practical applications, it is necessary that the following criteria be satisfied. In the knife test, the percentage of wood failure must be more than 30%. In the block shearing test, the bonding strength must be more than 70 kg/cm², in the boiling water soak delamination test, the percentage of delamination must be no more than 5%, in the dimensional test, the percentage of reduction of thickness must be no more than 2%.

The bonding conditions for satisfying the foregoing criteria are as follows. The cold press system requires one day in a clamping time, the high frequency through heating system: 7.5 minutes in the high frequency heating time, the hot press system: 21 minutes in a hot press time and the steam jetting high frequency surface heating system: 3 minutes in the high frequency heating time.

Accordingly, the curing time in the steam jetting high frequency surface heating system is significantly less than that in the cold press system, 1/2.5 times less than that in the high frequency through heating system by and 1/7 times less than that in the hot press system. Further, the calorie consumption in the former is remarkably less than that in the hot press system and the consumed power supply in the former is 1/4.8 times less than that in the high frequency through heating system.

Accordingly, it has been shown that the steam jetting high frequency surface heating system is significantly more efficient than the prior art in terms of the required curing time and power supply consumption.

In addition, the steam jetting high frequency surface heating system is more effective in case of e.g. thicker pieces of lumber. Namely, for such pieces, the heating time in the high frequency through heating system must be increased by a ratio more than the ratio of increment of lumber mass, and the press time in the hot press system must be increased 1.5 power times more than that. The curing time of the steam jetting high frequency surface heating system according to this invention is the same even though the pieces of lumber being employed are thicker.

The second embodiment of this invention relating to a process for manufacturing laminated wood will now be described with reference to FIG. 2.

(1) Both finished surfaces of each of two laminae are coated with a glue.

(2) Both finished surfaces of each of three different laminae are heated using the hot press system.

Figure 2:
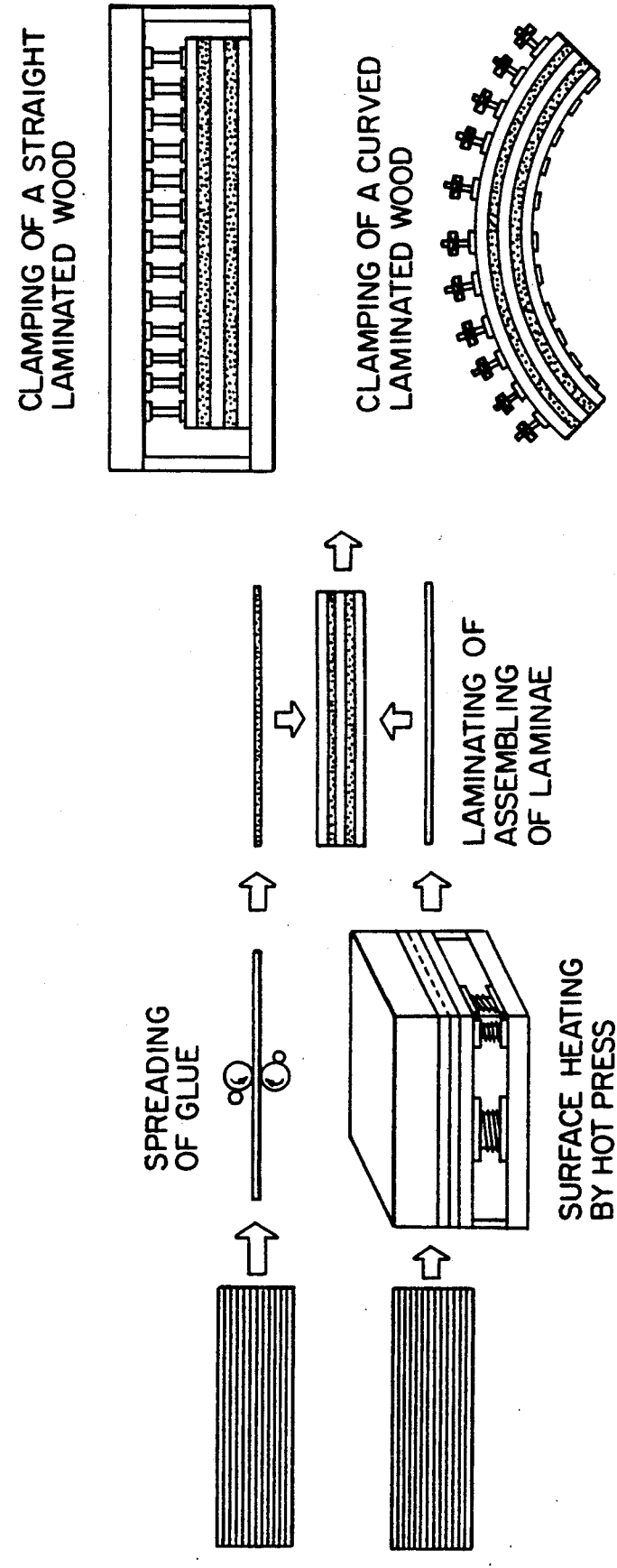
FIG. 2 is a flow chart of a process according to a second embodiment of this invention, for which a laminated plate is applied.

(3) The two adhesive coated laminae and the three heat-treated laminae are layered upon each other such that the glue-coated laminae are sandwiched between the heat-treated laminae, as illustrated in FIG. 2.

(4) The five laminae thus-assembled are then clamped and pressed as soon as possible.

The foregoing clamping process may utilize a clamping means for a straight laminated wood as well as for a curved laminated wood, as shown in FIG. 2.

The clamping means for the straight laminated wood employs a cold press system by oil pressure, and that for the curved laminated wood employs a screw clamping system.

The test conditions for the straight laminated wood were as follows.

(a) The heating temperature by the hot press was 150° C. and the heating time was 7.5 min., 10 min., and 12.5 min. respectively.

(b) Assembly time: None.

(c) The working time for clamping was 2 to 3 minutes. The pressure was maintained for 7.5 min., 10 min., and 12.5 min. respectively likewise in the foregoing heating time. As shown in Table 2 as listed hereinafter, the bonding performance was the best in case where the heating time as well as the pressure maintenance time were each more than 10 minutes.

The test conditions for the curved laminated wood were as follows:

(a) The heating temperature by the hot press was either 120° C. or 150° C. and the heating time was varied from 6 to 12 minutes.

(b) Assembly time: 0 to 2.5 minutes.

(c) The working time for clamping varied from 1.5 to 3.5 minutes and the pressure maintenance time varied from 5 to 7.5 minutes.

As shown in Table 2 below, the bonding performance was the best in the following case: a heating temperature of 120° C. with a heating time of 10 to 15 minutes or a heating temperature of 150° C. with heating time 6 to 12 minutes, assembly time: zero, working time for clamping: with 3.5 minutes, clamping maintenance time: 7.5 minutes.

The following are the test data of the foregoing two tests for the straight laminated wood and the curved laminated wood respectively, for which the surface heating system by the hot press was adopted.

(a) In case of the straight laminated wood:
1. Material
   Species: Douglas fir
   Specific gravity: 0.05 to 0.60
   Moisture content: 10 to 15%
   Dimension: 35 mm thickness × 150 mm width × 2,000 mm length
   Number of laminations: 5 layers
2. Adhesive
   Resolcynol resin adhesive agent
   Ratio of contents: 100 parts adhesive
   15 parts of paraformaldehyde
   10 parts of filler
   Glue coating: 250 g/m²
3. Heating conditions by the hot press
   Temperature of heat disc: 120° C., 150° C.
   Clamping pressure: 2 to 3 kg/cm²
   Clamping time: 7.5 min., 10 min., 12.5 min.
4. Conditions of the cold press
   Temperature of cold plate: 20° C.
   Clamping pressure: 10 kg/cm²
   Clamping time: 7.5 min., 10 min., 12.5 min.

(b) In case of the curved laminated wood

-continued

| 1. | Material | |
|---|---|---|
| | Species: | Douglas fir |
| | Specific gravity: | 0.50 to 0.60 |
| | Moisture content: | 10 to 15% |
| | Dimension: | 35 mm thickness × 150 mm width × 2,000 length |
| | Number of laminations: | 5 layers |
| 2. | Adhesive | |
| | Resolcynol resin adhesive agent | |
| | Ratio of contents: | 100 parts of adhesive agent 15 parts of paraformaldehyde 10 parts of filler |
| | Glue coating: | 250 g/cm$^2$ |
| 3. | Heating conditions by the hot press | |
| | Temperature of hot disc: | 120° C., 150° C. |
| | Clamping pressure | 2 to 3 kg/cm$^2$ |
| | Clamping time: | 6 to 15 minutes |
| 4. | Conditions of screw clamping | |
| | Clamping space: | 250 to 300 mm |
| | Radius of curvature: | 2500 mm, 3000 mm, 3500 mm |
| | Working time for clamping: | 1.5 to 3.5 min. |
| | Pressure maintenance time: | 5 min., 7.5 min. |

TABLE 2

| [1] | | | [2] | | | [3] [10] | | |
|---|---|---|---|---|---|---|---|---|
| [4] | [5] | [6] | [7] | [8] | [9] | [11] | [12] | [13] |
| 150 | 7.5 | | | 2.00 | 7.5 | ⊚⊚⊚ | ⊚⊚° | △⊚△ |
| 150 | 10.5 | [14] | [15] | 3.00 | 10.5 | ⊚° | °⊚° | °⊚° |
| 150 | 12.5 | | | 1.75 | 12.5 | ⊚⊚° | ⊚⊚⊚ | ⊚⊚° |
| 120 | 10.0 | | 3000 | 3.50 | 7.5 | °⊚⊚ | ⊚⊚⊚ | ° ° ° |
| | | [16] | | | | | | |
| 120 | 15.0 | | 3000 | 2.00 | 7.5 | ° ° ° | ⊚⊚⊚ | ⊚°⊚ |
| 150 | 6.0 | | 3000 | 1.50 | 7.5 | ⊚⊚⊚ | ⊚⊚⊚ | ⊚⊚⊚ |
| 150 | 8.0 | [16] | 3000 | 1.50 | 7.5 | ° ° ° | ⊚⊚⊚ | ⊚⊚° |
| 150 | 10.0 | | 3000 | 1.50 | 7.5 | °⊚⊚ | °⊚⊚ | ⊚° |
| 150 | 12.0 | | 3000 | 1.50 | 7.5 | ⊚°⊚ | °⊚⊚ | °⊚° |
| 150 | 12.0 | | 2500 | 1.75 | 7.5 | ° ° ° | ⊚⊚⊚ | °⊚° |
| | | [16] | | | | | | |
| 150 | 12.0 | | 3500 | 1.25 | 7.5 | ⊚°° | ⊚°△ | ⊚⊚° |
| 150 | 12.0 | [16] | 3000 | 2.75 | 5.0 | x x x | x x x | x x x |
| | | [16] | | | | | | |
| — | — | | 3000 | 3.00 | (1 day) | ⊚⊚⊚ | ⊚⊚⊚ | ⊚⊚° |

Remarks:

| Symbol | Bonding strength (kg/cm$^2$) | Percentage of wood failure (%) | Percentage of delamination (%) |
|---|---|---|---|
| ⊚ | 100~ | 70~ | ~5 |
| ° | 75~100 | 50~70 | 5~10 |
| △ | 50~75 | 30~50 | 10~30 |
| x | 0~50 | 0~30 | 30~100 |

[1] Heating conditions by the hot press
[2] Clamping conditions by the cold press or screw clamping
[3] Test Results of the bonding performance test
[4] Heating temperature (°C.)
[5] Heating time (min.)
[6] Clamping system
[7] Radius of curvature (mm)
[8] Working time for clamping (min.)
[9] Pressure maintenance time (min.)
[10] Block shearing test
[11] Bonding strength
[12] Percentage of wood failure
[13] Delamination due to boiling water soak
[14] Cold press
[15] In case of the straight laminated wood The bonding strength was examined by the block shearing test, while the bonding durability was examined by the boiling water soak delamination test.

If in the block shearing test, the bonding strength is no less than 75 kg/cm$^2$ and the percentage of wood failure is no less than 50%, it has been confirmed that there is no obstacle for practical use. If the percentage of delamination is less than 10% in the boiling water soak delamination test, it has been confirmed that there is no obstacle for practical use.

The bonding conditions by the hot press for satisfying the foregoing criteria (Japanese Agricultural Standard for structural laminated timber) were as follows. In case of a straight laminated wood having five layers, with each layer having a thickness of 35 mm, the heating time and pressure maintenance time were 10 minutes and 12.5 minutes respectively at a temperature of 150° C. In case of a curved laminated wood having five layers, each layer having 20 mm thickness, the heating time was 10 or 15 minutes at a temperature of 120° C., while that was 6 to 12 minutes and the pressure maintenance time was 7.5 minutes at a temperature of 120° C. and 150° C.

Accordingly, when the surface heating system by the hot press is applied to the straight and curved laminated wood, the curing time is shorter than a conventional system (requiring one day) at a room temperature.

Further, the bonding performance of the laminated wood produced by the foregoing process is the same as that by the conventional curing system.

Since the working time for clamping is very short, e.g. 1.25 to 3.5 minutes, it is required to make it more efficiently in case of a large or long laminated wood.

Figure 3:
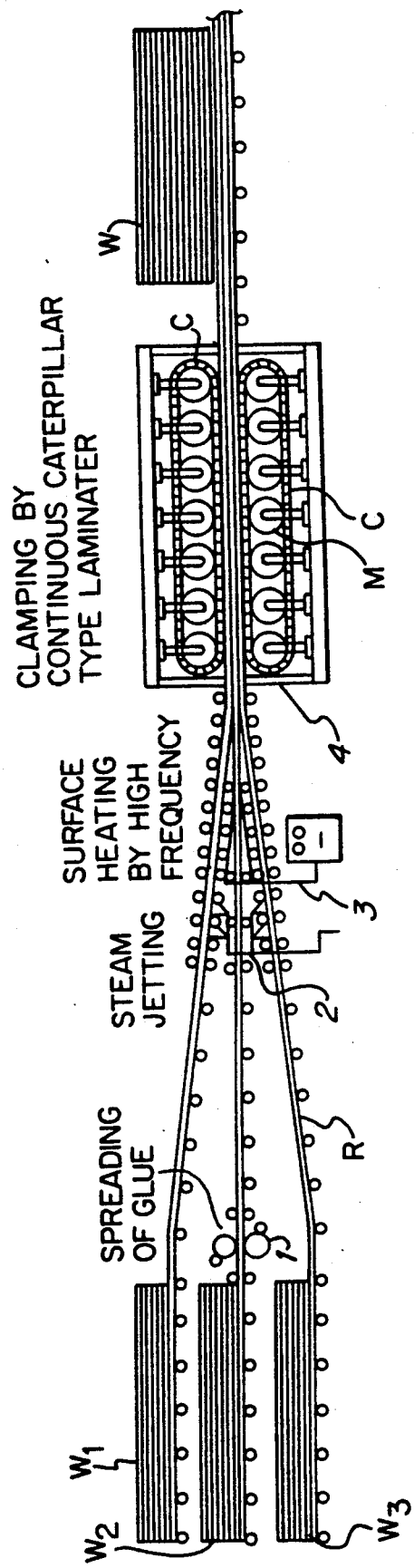
FIG. 3 is a side view of a high speed bonding device according to the first embodiment.

An example of a rapid bonding device that can be used in accordance with the present invention will be discussed with reference to FIG. 3.

The rapid bonding device comprises a glue spreading means 1, a steam jetting means 2, a high frequency heating means 3 and a continuous clamping means 4, which device is suitable for producing continuously in particular a 3-layer laminated wood structure or I beam. Each component of the system is linked with the others by a large number of feeding rollers R. When the pieces of lumber pass through a space between upper and lower rollers R, the glue is spread, the stem in jetted, the high frequency is applied for surface heating and finally the clamping is carried out.

More specifically, both surfaces of a piece of lumber W2 are coated with a glue in the glue-spreading means 1. In addition, one surface of a piece of lumber W1 and one surface of a piece of lumber W3, both of which face both the glue-coated surfaces of lumber W2, are steam-jetted by steam jetting means 2, surface-heated by high frequency heating means 3 and then all the lumber pieces W1, W2 and W3 are firmly clamped by continuous clamping means 4 comprising upper and lower caterpillars C rotatable by a plurality of driving wheels M. During the time when lumber pieces W1 and W3 pass through a space of the continuous clamping means 4, both lumber pieces W1 and W3 are bonded with the piece of lumber W2, and a finished product W is thereby obtained.

Figure 7A:
FIG. 7A is a view of a parallel chord truss.
Figure 7B:
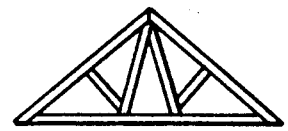
FIG. 7B is a view of a roof truss.
Figure 7C:
FIG. 7C is a view of a curved truss.

FIGS. 4 to 7C are various examples of the bonding process according to this invention, in which FIG. 4 is a view of a wood laminate. FIG. 5A is a view of box-beams wood. 5B is a view of an I-beam wood, FIG. 6 is a view of a wooden panel, FIG. 7A is a view of a parallel chord truss, FIG. 7B is a view of a roof truss and FIG. 7C is a view of a curved truss. The bonding of the truss is carried out on each gusset (not illustrated) in a joint portion between components.

Figure 8:
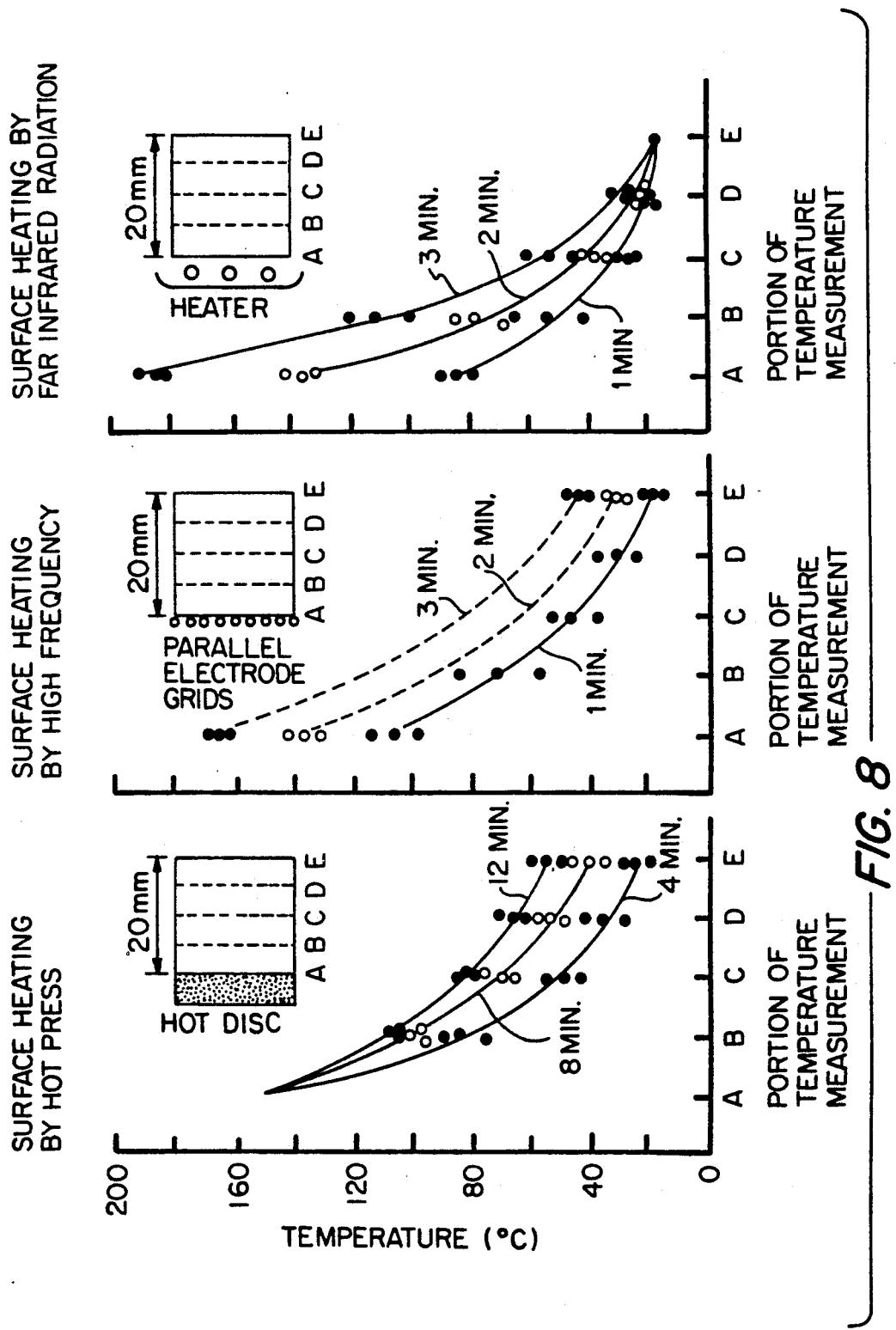
FIG. 8 is a graph of a temperature distribution of a surface-heated lumber according to this invention wherein the first box represents surface heating using a hot press; the second box represents surface heating by high frequency and the third box represents surface heating with far infrared radiation.

FIG. 8 is a graph of a temperature distribution from a heated surface (A) of a piece of lumber to a rear surface (E) thereof at the time of surface heating. As the heating time is increased, the temperature of the surface and interior of the lumber is raised. In case of a suitable heating time (a central curve line in each graph), it has been found that the surface temperature was 120° to 150° C. and the temperature of an area 5 mm away from the surface was 70° to 80° C., which is the curing temperature of Resolcyl resin adhesive.

Further, the temperature slope from the surface is more moderate in the hot press and high frequency heating and far infrared radiation in that order. Further, heat accumulation is more and bonding performance is more stable in that order.

As discussed previously, a surface of another lumber to be bonded with a glue-coated surface of one lumber is preheated, so that the bonding and curing time is shortened greatly and only the surface heating is required. Therefore, any waste heating energy is completely removed.

Prior to the surface heating, a steam is jetted to a surface of a lumber, so that the surface is observed by the steam. Thus, a density difference between spring wood and summer wood is reduced, thereby the heating process by use of high frequency application becomes more efficient and uniform.

Further, since the steam is jetted prior to the high frequency application, any cup of lumber that may occur in connection with the high frequency surface heating is eliminated.

Figure 9:
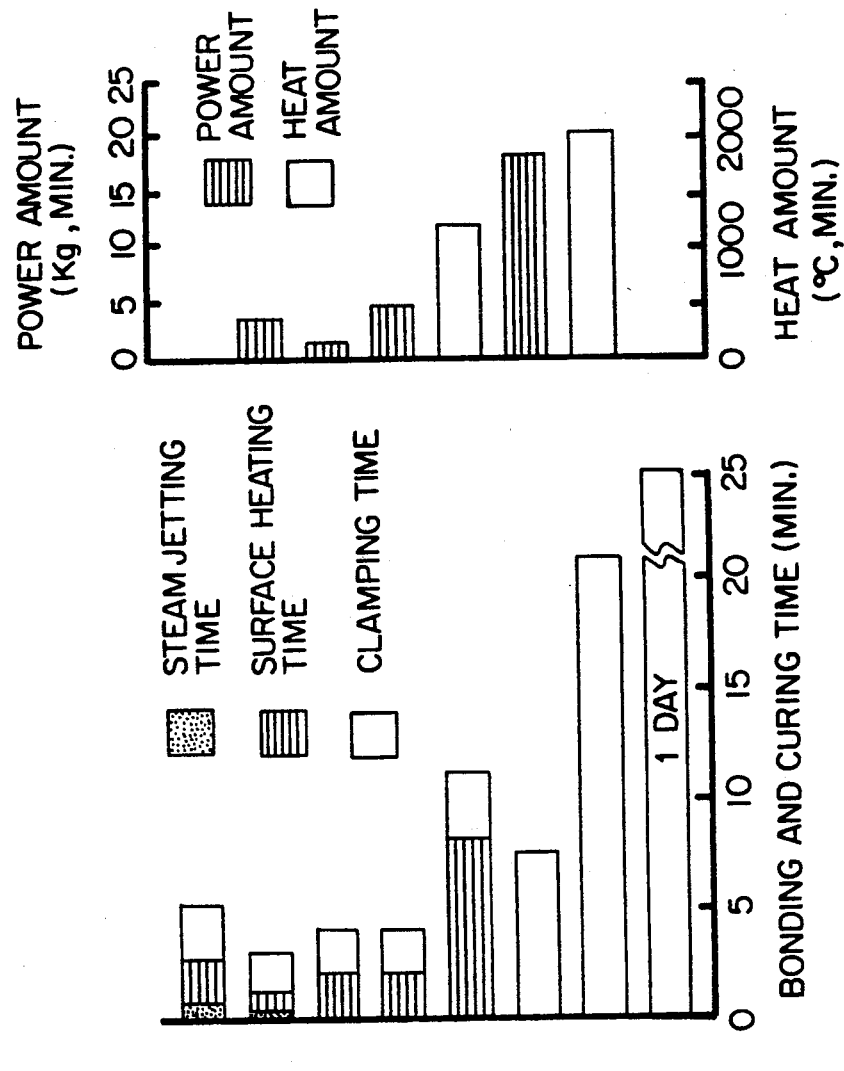
FIG. 9 is a graph of comparison of a curing time with a power consumption.
Figure 10:
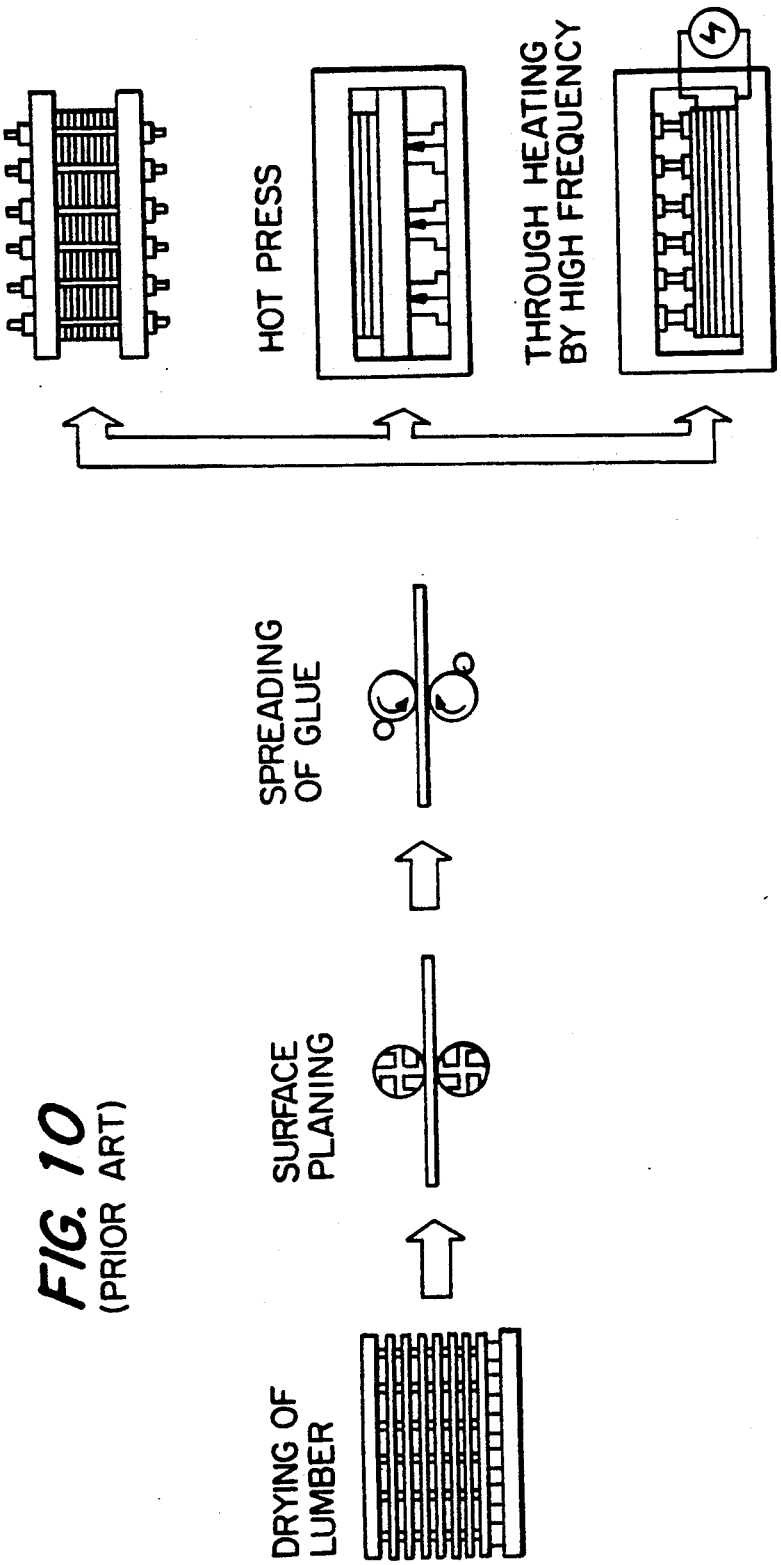
FIG. 10 illustrates a prior art process.

Still further, as shown in FIG. 9, the bonding and curing time is greatly shortened and the power supply is also reduced on a full-scale. In addition, a rapid continuous production is realized, and its productivity is very high.

What is claimed is:

1. A process for rapidly bonding lumber in order to form a laminated wood structure comprising the steps of:
   (a) applying a jet of steam to a surface of a first of two pieces of lumber to be bonded in the formation of the laminated wood structure;
   (b) applying high frequency energy to the steam-jetted surface of the first piece of lumber to raise the surface temperature thereof to 50° to 60° C.;
   (c) coating a surface of the second piece of lumber with adhesive, which surface has not been subjected to steam jetting and high frequency heating, then
   (d) contacting the thus-prepared steam-jetted, heated surface of the first piece of lumber with the adhesive-coated surface of the second piece of lumber; and
   (e) clamping the pieces of lumber together under pressure.

2. A process for rapidly bonding lumber according to claim 1 wherein the surface heating of the first piece of lumber is conducted with a high frequency application device comprising a plurality of parallel electrodes.

3. A process for rapidly bonding lumber according to claim 1 wherein the adhesive is applied in an amount of about 200 to 300 g/m$^2$.

4. A process for rapidly bonding lumber according to claim 3, wherein the clamping is conducted for 1 to 2 minutes under a pressure of from 5-15 kg/cm$^2$.

* * * * *